(12) United States Patent
Sharma et al.

(10) Patent No.: US 7,491,146 B2
(45) Date of Patent: *Feb. 17, 2009

(54) TORQUE DISTRIBUTING DRIVE ASSEMBLY FOR MOTOR VEHICLES

(75) Inventors: Anupam Sharma, East Syracuse, NY (US); Timothy M. Burns, Elbridge, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/009,782

(22) Filed: Jan. 22, 2008

(65) Prior Publication Data

US 2008/0139359 A1    Jun. 12, 2008

Related U.S. Application Data

(63) Continuation of application No. 11/396,139, filed on Mar. 31, 2006, now Pat. No. 7,344,469.

(60) Provisional application No. 60/694,474, filed on Jun. 28, 2005.

(51) Int. Cl.
    *F16H 48/20* (2006.01)
(52) U.S. Cl. .................. 475/221; 475/225; 475/231; 475/249
(58) Field of Classification Search ............... 475/205, 475/221, 223, 225, 230, 231, 249
    See application file for complete search history.

(56) References Cited

U.S. PATENT DOCUMENTS

| | | | |
|---|---|---|---|
| 672,620 A | 6/1901 | Buffum | |
| 856,703 A | 6/1907 | Iversen | |
| 1,382,289 A | 6/1921 | Janicki | |
| 1,792,485 A | 2/1931 | Fawick | |
| 1,954,686 A | 4/1934 | Stickney | |
| 1,964,956 A | 7/1934 | Lincoln | |
| 2,075,980 A | 4/1937 | Fawick | |
| 2,466,683 A | 4/1949 | Buckendale | |
| 3,690,426 A | 9/1972 | Weisgerber | |
| 4,691,593 A | 9/1987 | Mueller | |
| 4,757,728 A | 7/1988 | Pitsch | |
| 4,763,747 A | 8/1988 | Muller | |
| 4,973,296 A | 11/1990 | Shibahata | |

(Continued)

FOREIGN PATENT DOCUMENTS

WO    WO 02/09966 A1    2/2002

*Primary Examiner*—Ha D. Ho
(74) *Attorney, Agent, or Firm*—Harness, Dickey & Pierce, P.L.C.

(57) ABSTRACT

A drive axle assembly includes first and second axleshafts and a drive mechanism coupling a driven input shaft to the axleshafts. The drive mechanism includes a differential assembly, a planetary gear assembly operably disposed between the differential assembly and the first axleshafts, a transfer clutch and first and second brakes. The first brake is operable with the transfer clutch and the planetary gear assembly to increase the rotary speed of the first axleshaft which, in turn, causes a corresponding decrease in the rotary speed of the second axleshaft. The second brake is operable with the transfer clutch and the planetary gear assembly to decrease the rotary speed of the first axleshaft so as to cause an increase in the rotary speed of the second axleshaft. A control system controls actuation of both brakes and the transfer clutch.

20 Claims, 6 Drawing Sheets

U.S. PATENT DOCUMENTS

| | | | |
|---|---|---|---|
| 5,370,588 A | 12/1994 | Sawase et al. | |
| 5,415,598 A | 5/1995 | Sawase et al. | |
| 5,456,641 A | 10/1995 | Sawase | |
| 5,632,185 A | 5/1997 | Gassmann | |
| 5,692,987 A | 12/1997 | Shibahata et al. | |
| 5,699,888 A | 12/1997 | Showalter | |
| 5,904,634 A | 5/1999 | Teraoka | |
| 5,910,064 A | 6/1999 | Kuroki | |
| 5,911,291 A | 6/1999 | Suetake et al. | |
| 6,056,660 A | 5/2000 | Mimura | |
| 6,120,407 A | 9/2000 | Mimura | |
| 6,213,241 B1 | 4/2001 | Kita et al. | |
| 6,378,677 B1 | 4/2002 | Kuroda et al. | |
| 6,394,246 B1 | 5/2002 | Gassmann et al. | |
| 6,520,880 B1 | 2/2003 | Fukushima et al. | |
| 6,533,090 B2 | 3/2003 | Osborn et al. | |
| 6,616,566 B2 | 9/2003 | Gorlich | |
| 6,645,108 B1 | 11/2003 | Gradu | |
| 6,962,227 B1 | 11/2005 | Kirkwood | |
| 7,004,876 B2 | 2/2006 | Puiu | |
| 2005/0252707 A1 | 11/2005 | Bowen | |
| 2005/0261098 A1 | 11/2005 | Bowen | |
| 2005/0261099 A1 | 11/2005 | Bowen | |
| 2005/0266952 A1 | 12/2005 | Puiu | |
| 2005/0266953 A1 | 12/2005 | Puiu | |
| 2008/0004149 A1* | 1/2008 | Mohan et al. | 475/221 |

* cited by examiner

TORQUE DISTRIBUTING DRIVE ASSEMBLY FOR MOTOR VEHICLES

CROSS REFERENCE

This application is a continuation of U.S. patent application Ser. No. 11/396,139 filed Mar. 31, 2006, now U.S. Pat. No. 7,344,469, which claims the benefit of U.S. Provisional Application Ser. No. 60/694,474 filed Jun. 28, 2005. The disclosure of the above applications are incorporated herein by reference.

FIELD OF THE INVENTION

The present invention relates generally to differential assemblies for use in motor vehicles and, more specifically, to a differential assembly equipped with a torque vectoring drive mechanism and an active control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches are used to provide this side-to-side control, as is disclosed in U.S. Pat. Nos. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Accordingly, it is an objective of the present invention to provide a drive axle assembly for use in motor vehicles which are equipped with an adaptive yaw control system.

To achieve this objective, the drive axle assembly of the present invention includes first and second axleshafts connected to a pair of wheels and a drive mechanism that is operable to transfer drive torque from a driven input shaft to the first and second axleshafts. The drive mechanism includes a differential assembly, a planetary gear assembly, first and second brakes and a torque vectoring friction clutch. The planetary gear assembly is operably disposed between the differential assembly and the first axleshaft. The first brake is operable in association with the friction clutch and the planetary gear assembly to increase the rotary speed of the first axleshaft which, in turn, causes a decrease in the rotary speed of the second axleshaft. In contrast, the second brake is operable in association with the friction clutch and the planetary gear assembly to decrease the rotary speed of the first axleshaft so as to cause a corresponding increase in the rotary speed of the second axleshaft. Accordingly, selective control over actuation of the friction clutch and one or both of the first and second brakes provides adaptive control of the speed differentiation and the torque transferred between the first and second axleshafts. A control system including and ECU and sensors is provided to control actuation of both brakes and the friction clutch.

Pursuant to an alternative objective, the drive mechanism can be utilized in a power transfer unit, such as a transfer case, of a four-wheel drive vehicle to adaptively control the front-rear distribution of drive torque delivered from the powertrain to the front and rear wheels.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
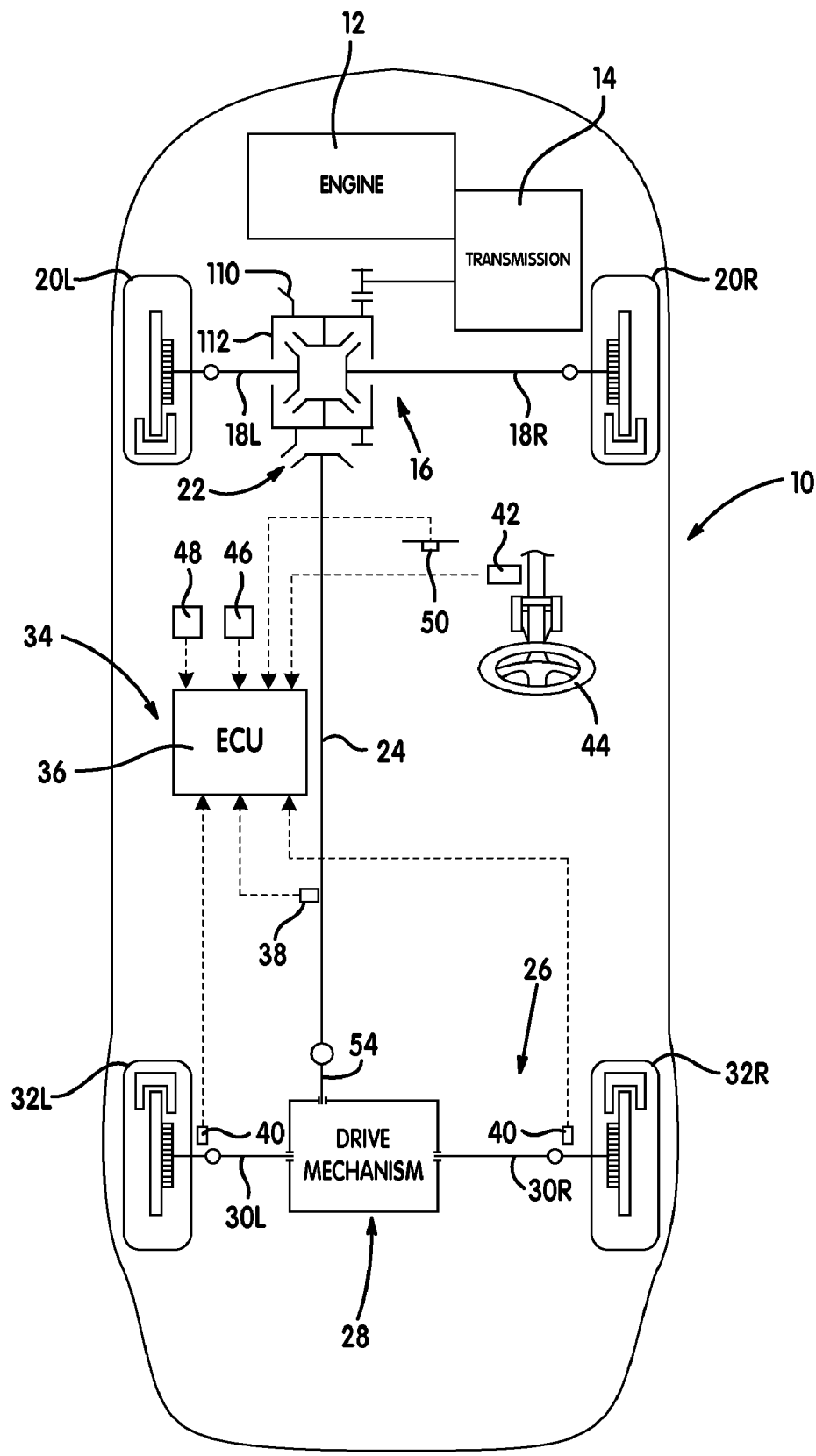
FIG. 1 is a diagrammatical illustration of an all-wheel drive motor vehicle equipped with a torque distributing drive axle assembly and active yaw control system of the present invention.

Referring to FIG. 1, an all-wheel drive vehicle 10 includes an engine 12 mounted in a front portion of vehicle 10, a transmission 14 driven by engine 12, a front differential 16 which connects the output of transmission 14 to front axleshafts 18L and 18R for driving left and right front wheels 20L and 20R, a power transfer unit ("PTU") 22 which connects front differential 16 to a propshaft 24, and a rear axle assembly 26 having a drive mechanism 28 which connects propshaft 24 to rear axleshafts 30L and 30R for driving left and right rear wheels 32L and 32R. As will be detailed, drive mechanism 28 is operable in association with a yaw control system 34 for controlling the transmission of drive torque through rear axleshafts 30L and 30R to rear wheels 32L and 32R.

In addition to an electronic control unit (ECU) 36, yaw control system 34 includes a plurality of sensors for detecting various operational and dynamic characteristics of vehicle 10. For example, a front wheel speed sensor 38 is provided for determining a front wheel speed value based on rotation of propshaft 24, a pair of rear wheel speed sensors 40 are operable to detect the individual rear wheel speed values based rotation of left and right axleshafts 30L and 30R, and a steering angle sensor 42 is provided to detect the steering angle of a steering wheel 44. The sensors also include a yaw rate sensor 46 for detecting a yaw rate of the body portion of vehicle 10, a lateral acceleration sensor 48 for detecting a lateral acceleration of the vehicle body, and a lock switch 50 for permitting the vehicle operator to intentionally shift drive mechanism 28 into a locked mode. As will be detailed, ECU 36 controls operation of a pair of brakes and a torque vectoring friction clutch that are associated with drive mechanism 28 by utilizing a control strategy that is based on input signals from the various sensors and lock switch 50.

Rear axle assembly 26 includes an axle housing 52 within which drive mechanism 28 is supported. In general, drive mechanism 28 includes an input shaft 54, a differential assembly 56, a planetary gear assembly 58, a first or "overdrive" brake 60, a second or "underdrive" brake 62 and a torque vectoring friction clutch 64. As seen, input shaft 54 includes a pinion gear 66 that is in constant mesh with a hypoid ring gear 68. Hypoid ring gear 68 is fixed for rotation with a ring gear 70 which acts as the input component of differential assembly 56. Differential assembly 56 further includes a first output component shown as a sun gear 72 that is fixed for rotation with right axleshaft 30R, a second output component shown as a differential carrier 74 that is fixed for rotation with left axleshaft 30L and a plurality of meshed pairs of first pinions 76 and second pinions 78. Carrier 74 includes a first carrier ring 80 fixed to left axleshaft 30L, a second carrier ring 82 and a set of first pins 84 extending between carrier rings 80 and 82 on which first pinions 76 are rotatably supported. Carrier 74 also includes a set of second pins 86 extending between carrier rings 80 and 82 which rotatably support second pinions 78. As seen, first pinions 76 are meshed with sun gear 72 while second pinion gears 78 are meshed with ring gear 70. While not limited thereto, the gearing associated with differential assembly 56 is preferably configured to normally provide an equal torque split (i.e., 50-50) to its output components.

Planetary gear assembly 58 is a ravigneaux gearset having a first gearset 90 and a second gearset 92. First gearset 90 includes a first sun gear 94, a first ring gear 96, and a set of first planet gears 98 meshed with first sun gear 94 and first ring gear 96. Each of first planet gears 98 is rotatably supported on a post 100 extending between first and second carrier rings 102 and 104, respectively, that in combination define a first planet carrier 106.

Second gearset 92 includes a second sun gear 110, a second ring gear 112 and a set of second planet gears 114 meshed therewith. Each of second planet gears 114 is rotatably supported on a post 116 extending between third and fourth carrier rings 118 and 120, respectively, that in combination define a second planet carrier 122. As seen, second ring gear 112 is coupled via a first drum 124 to second carrier ring 104 for common rotation with first planet carrier 106. In addition, third carrier ring 118 is fixed for rotation with right axleshaft 30R while fourth carrier ring 120 is fixed via a second drum 126 for common rotation with first ring gear 96.

Figure 2:
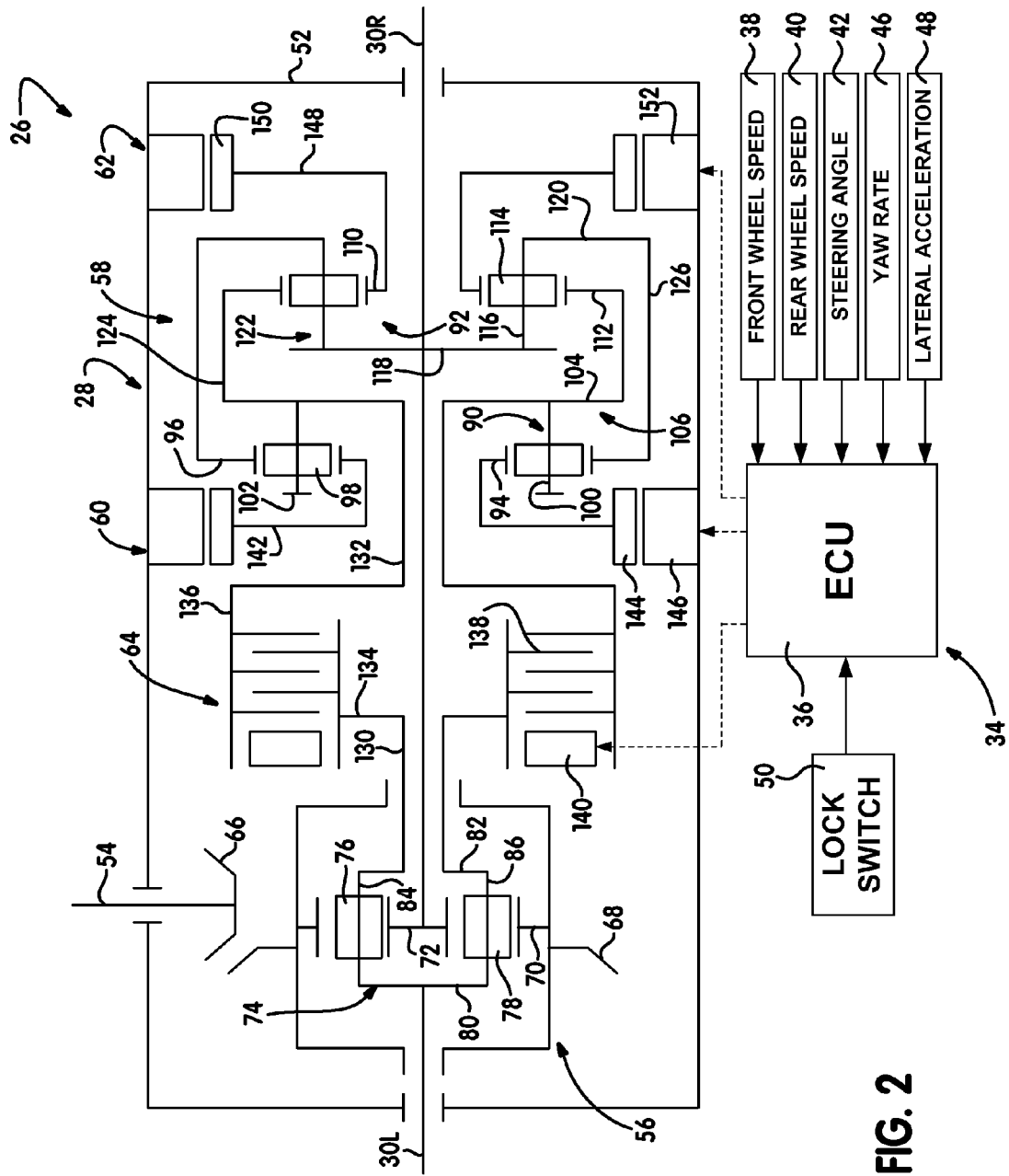
FIG. 2 is a schematic illustration of the drive axle assembly shown in FIG. 1 according to the present invention.

With continued reference to FIG. 2, drive mechanism 28 is shown to further include a first transfer shaft 130 that is rotatably supported on right axleshaft 30R and which is fixed to second carrier ring 82 for common rotation with differential carrier 74 of differential assembly 56. Likewise, a second transfer shaft 132 is rotatably supported on right axleshaft 30R and fixed to carrier ring 104 for common rotation with first planet carrier 106 of planetary gear assembly 58. As seen, friction clutch 64 is operably disposed between first transfer shaft 130 and second transfer shaft 132 for selectively coupling planetary gear assembly 58 to differential carrier 74 which, as noted, is commonly driven with left axleshaft 30L. Friction clutch 64 includes a clutch hub 134 fixed for rotation with first transfer shaft 130, a drum 136 fixed for rotation with second transfer shaft 132, a multi-plate clutch pack 138 disposed between hub 134 and drum 136 and a power-operated clutch actuator 140.

Friction clutch 64 is operable in a first or "released" mode so as to permit unrestricted rotation of first planet carrier 106 of gear assembly 58 relative to differential carrier 74. In contrast, friction clutch 64 is operable in a second or "locked" mode for inhibiting rotation of first planet carrier 106 of gear assembly 58 relative to differential carrier 74. Friction clutch 64 is shifted between its released and locked modes via actuation of clutch actuator 140 in response to control signals from ECU 36. Specifically, friction clutch 64 is operable in its released mode when clutch actuator 140 applies a predetermined minimum clutch engagement force on clutch pack 138 and is further operable in its locked mode when clutch actuator 140 applies a predetermined maximum clutch engagement force on clutch pack 138.

With continued reference to FIG. 2, first brake 60 is shown to be operatively disposed between first sun gear 94 and axle housing 52 such that it is operable to selectively brake rotation of first sun gear 94. First brake 60 includes a brake hub 142 fixed for rotation with first sun gear 94 and having a rim segment with a layer of a friction material 144 thereon. First brake 60 also includes a power-operated brake actuator 146. First brake 60 is operable in a first or "released" mode so as to permit unrestricted rotation of first sun gear 94 relative to housing 52. With first brake 60 in its released mode, brake actuator 146 is disengaged from friction material 144 on the rim segment of brake hub 142. In contrast, first brake 60 is also operable in a second or "locked" mode for inhibiting rotation of first sun gear 94. With first brake 60 in its locked mode, brake actuator 146 is engaged with friction material 144 on the rim segment of brake hub 142 so as to brake rotation of first sun gear 94. First brake 60 is shifted between its released and locked modes via actuation of power-operated brake actuator 146 in response to electric control signals from ECU 36.

Second brake 62 is shown to be operably arranged between second sun gear 110 and axle housing 52. Second brake 62 includes a clutch hub 148 fixed for rotation with second sun gear 110 and having a rim segment with a layer of friction material 150 thereon. Second brake 62 also includes a power-operated brake actuator 152. Second brake 62 is operable in a first or "released" mode to permit unrestricted rotation of second sun gear 110. With second brake 62 in its released mode, brake actuator 152 is disengaged from friction material 150 on the rim segment of brake hub 148. In contrast, second brake 62 is also operable in a second or "locked" mode for inhibiting rotation of second sun gear 110. With second brake 62 in its locked mode, brake actuator 152 is engaged with friction material 150 on the rim segment of brake hub 148 so as to brake rotation of second sun gear 110. Second brake 62 is shifted between its released and locked modes via actuation of power-operated brake actuator 152 in response to control signals from ECU 36.

Figure 3:
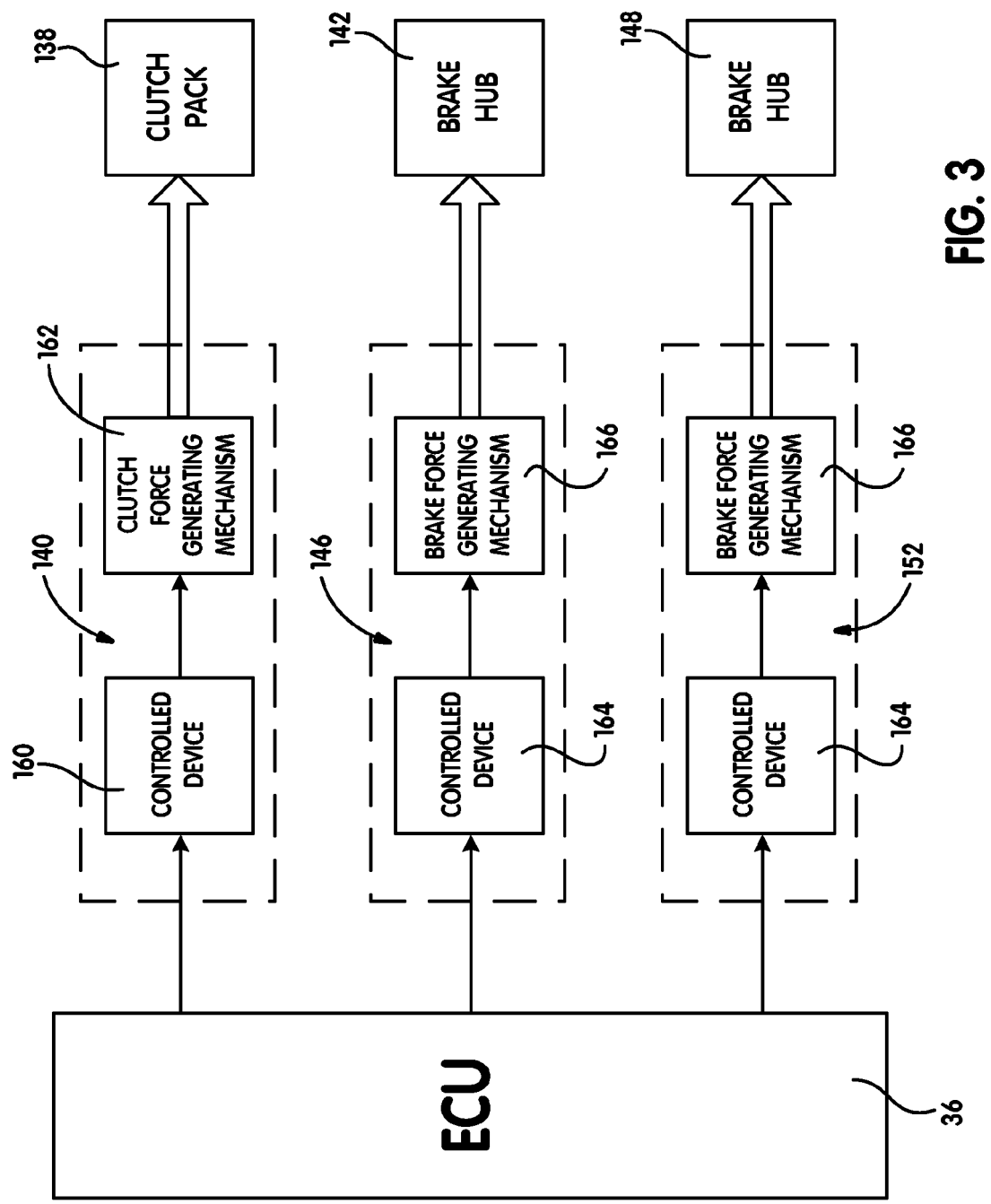
FIG. 3 is a diagrammatical illustration of the power-operated brake actuators and the power-operated clutch actuator associated with the drive axle assembly of the present invention.

Power-operated brake actuators 146 and 152 and power-operated clutch actuator 140 are shown in block format to cumulatively represent the components required to accept a control signal from ECU 36 and generate an engagement force to be applied to its corresponding clutch pack or brake hub. To this end, FIG. 3 diagrammatically illustrates the basic components associated with such power-operated clutch and brake actuators. Specifically, power-operated clutch actuator 140 includes a controlled device 160 and a force generating mechanism 162. In electromechanical systems, controlled device 160 would represent such components as, for example, an electric motor or an electromagnetic solenoid assembly capable of receiving an electric control signal from ECU 36. The output of controlled device 160 would control operation of force generating mechanism 162. Force generating mechanism 162 could be comprised of, for example, a ball ramp unit, a ball screw unit, a leadscrew unit, a pivotal lever arm, rotatable cam plates, etc., all of which are capable of converting the output of controlled device 160 into a clutch engagement force. Force generating mechanism 162 functions to also transmit and exert the clutch engagement force onto clutch pack 138 via an apply plate that is moveable into and out of engagement with clutch pack 138. If a hydramechanical system is used, controlled device 160 would be a flow or pressure control valve operable in response to control signals from ECU 36 for delivering pressurized fluid from a fluid source to a piston chamber. A piston disposed for movement in the piston chamber would act as force generating mechanism 162. Preferably, controlled device 160 is also capable of receiving variable electric control signals from ECU 36 for permitting modulation of the magnitude of the clutch engagement force generated and applied to clutch pack 138 so as to permit "adaptive" control of friction clutch 64.

Brake actuators 146 and 152 are also schematically shown in FIG. 3 to each include a controlled device 164 and a brake force generating mechanism 166. Controlled devices 164 could be electrically-operated motors or electromagnetic solenoids capable of receiving electric control signals from ECU 36. The output of controlled device 164 would control operation of force generating mechanism 166 comprised of, for example, a caliper unit capable of converting the output of controlled device 164 into a brake force that would be applied to a corresponding one of brake hubs 142 and 148. Alternatively, force generating mechanism 166 could be any known clamping assembly capable of engaging and holding brake hubs 142 and 148 against rotation.

In accordance with the arrangement shown, drive mechanism 28 is operable in coordination with yaw control system 34 to potentially establish four distinct operational modes for controlling the transfer of drive torque from input shaft 54 to axleshafts 30L and 30R. In particular, a first operational mode is established when first brake 60, second brake 62 and friction clutch 64 are all in their released mode. As such, differential assembly 56 acts as an "open" differential so as to permit unrestricted speed differentiation with drive torque transmitted to each axleshaft 30L and 30R based on the tractive conditions at each corresponding rear wheel 32L and 32R. A second operational mode is established when first brake 60, second brake 62 and friction clutch 64 are all in their locked mode such that differential assembly 56 acts as a "locked" differential with no speed differentiation permitted between rear axleshafts 30L and 30R. This mode can be intentionally selected via actuation of lock switch 50 when vehicle 10 is being operated off-road or on poor roads.

A third operational mode is established when first brake 60 is shifted into its locked mode, second brake 62 is shifted into its released mode and friction clutch 64 is shifted into its locked mode. As a result, first planet carrier 106 of gear assembly 58 is coupled for rotation with left axleshaft 30L via differential carrier 74 of differential assembly 56 while first sun gear 94 is braked. As such, gear assembly 58 causes first ring gear 96 to be driven at an increased speed (i.e., overdriven) relative to the rotary speed of first planet carrier 106. Therefore, right axleshaft 30R is overdriven relative to left axleshaft 30L due to its connection to first ring gear 96 via second drum 126 and second planet carrier 122. Accordingly, this third operational mode can be established to overdrive right axleshaft 30R when required to accommodate the current tractive or steering conditions detected and/or anticipated by ECU 36 based on the particular control strategy used.

A fourth operational mode is established when first brake 60 is shifted into its released mode, second brake 62 is shifted into its locked mode, and friction clutch 64 is shifted into its locked mode. As a result, first planet carrier 106 of gear assembly 58 is coupled to differential carrier 74 while second sun gear 110 is braked. As such, gear assembly 58 causes second planet carrier 122 to be driven at a decreased speed (i.e., underdriven) relative to the rotary speed of first planet carrier 106. Therefore, right axleshaft 30R is underdriven relative to left axleshaft 30L to accommodate the tractive or steering conditions detected and/or anticipated by ECU 36.

At the start of vehicle 10, power from engine 12 is transmitted to front wheels 20L and 20R through transmission 14 and front differential 16. This drive torque is also transmitted to drive mechanism 28 through PTU 22 and propshaft 24 for rotatably driving input pinion shaft 58. Typically, brakes 60 and 62 and friction clutch 64 would be non-engaged such that drive torque is transmitted through differential unit 56 to rear wheels 32L and 32R. However, upon detection of lost traction at front wheels 20L and 20R, one or both brakes 60 and 62 and friction clutch 64 can be engaged to provide drive torque to rear wheels 32L and 32R based on the tractive needs of vehicles 10. With both brakes 60 and 62 shifted into their released mode, planetary gear assembly 58 rotates as a unit. This is beneficial since only small, if any, slip speeds are generated across clutch pack 138 of friction clutch 64, thereby limiting the parasitic losses generated during most typical driving conditions. In addition, all torque transfer or "vectoring" between axleshafts 30L and 30R is transmitted through engagement of friction clutch 64. Further, only on-off control of brakes 60 and 62 is required with modulated control of friction clutch 64 permitting the adaptive regulation of the torque vectoring characteristics.

In addition to on-off control of friction clutch 64 to establish the various drive modes associated with direct or underdrive connections through planetary gearset 58, it is further contemplated that variable clutch engagement forces can be generated by power-operated clutch actuator 140 to adaptively control left-to-right speed and torque characteristics. This adaptive control feature functions to provide enhanced yaw and stability control for vehicle 10. For example, a "reference" yaw rate can be determined based on the steering angle detected by steering angle sensor 42, a vehicle speed calculated based on signals from the various speed sensors and a lateral acceleration detected by lateral acceleration sensor 48 during turning of vehicle 10. ECU 36 compares this reference yaw rate with an "actual" yaw rate detected by yaw sensor 46. This comparison will determine whether vehicle 10 is in an understeer or an oversteer condition so as to permit yaw control system 34 to accurately adjust or accommodate for these types of steering tendencies. ECU 36 can address such conditions by shifting drive mechanism 28 into the specific operative drive mode that is best suited to correct the actual or anticipated oversteer or understeer situation. Optionally, variable control of friction clutch 64 also permits adaptive regulation of the side-to-side torque and speed characteristics if one of the distinct drive modes is not adequate to accommodate the current steer tractive condition.

Figure 4:
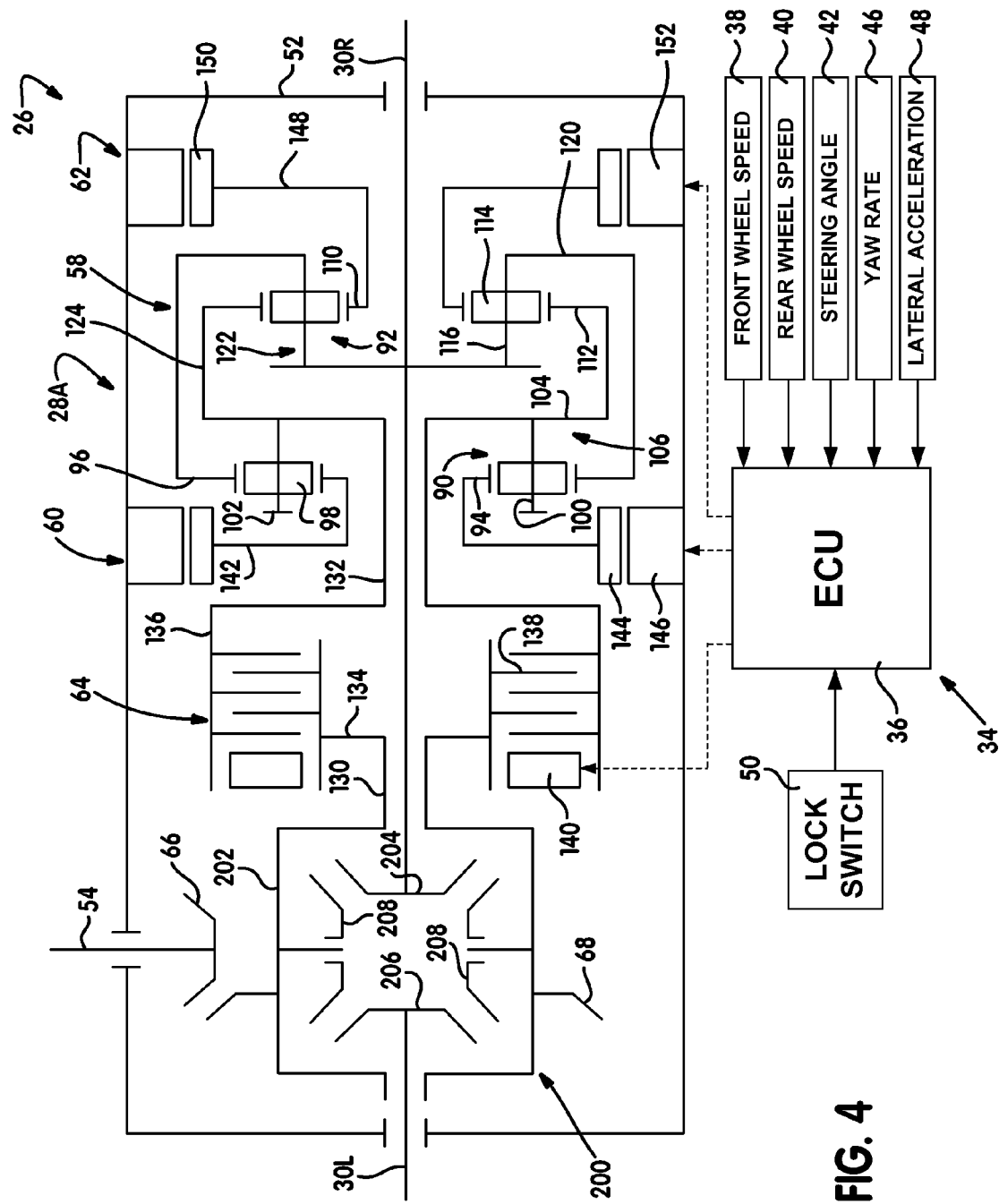
FIG. 4 is a schematic illustration of an alternative embodiment of the drive axle assembly of the present invention.

Referring now to FIG. 4, an alternative embodiment of drive mechanism 28 of FIG. 2 is shown and designated by reference numeral 28A. Generally speaking, a large number of components are common to both drive mechanism 28 and 28A, with such components being identified by the same reference numbers. However, drive mechanism 28A is shown to include a modified differential assembly 200 of the bevel type having a differential carrier 202 driven by hypoid ring gear 68 so as to act as its input component. Differential assembly 200 further includes a first output component shown as a first side gear 204 that is fixed for common rotation with right axleshaft 30R, a second output component shown as a second side gear 206 that is fixed for common rotation with left axleshaft 30L and pinion gears 208 driven by carrier 202 and which are each meshed with side gears 204 and 206. As seen, first transfer shaft 130 now connects differential carrier 202 for common rotation with hub 134 of friction clutch 64.

Drive mechanism 28A is similar in operation to drive mechanism 28 except that friction clutch 64 now functions to selectively connect gear assembly 58 to the input component (i.e., carrier 202) of differential 200 instead of directly to its second output component. As such, modulation of the engagement of friction clutch 64 when either of brakes 60 and 62 is engaged results in torque vectoring to left axleshaft 30L through pinion gears 208. As such, the rotary speed of left axleshaft 30L relative to right axleshaft 30R can be increased or decreased by controlling engagement of brakes 60 and 62 and friction clutch 64 in the same manner previously described for driven mechanism 28 to establish the four distinct operational modes for drive mechanism 28A.

Figure 5:
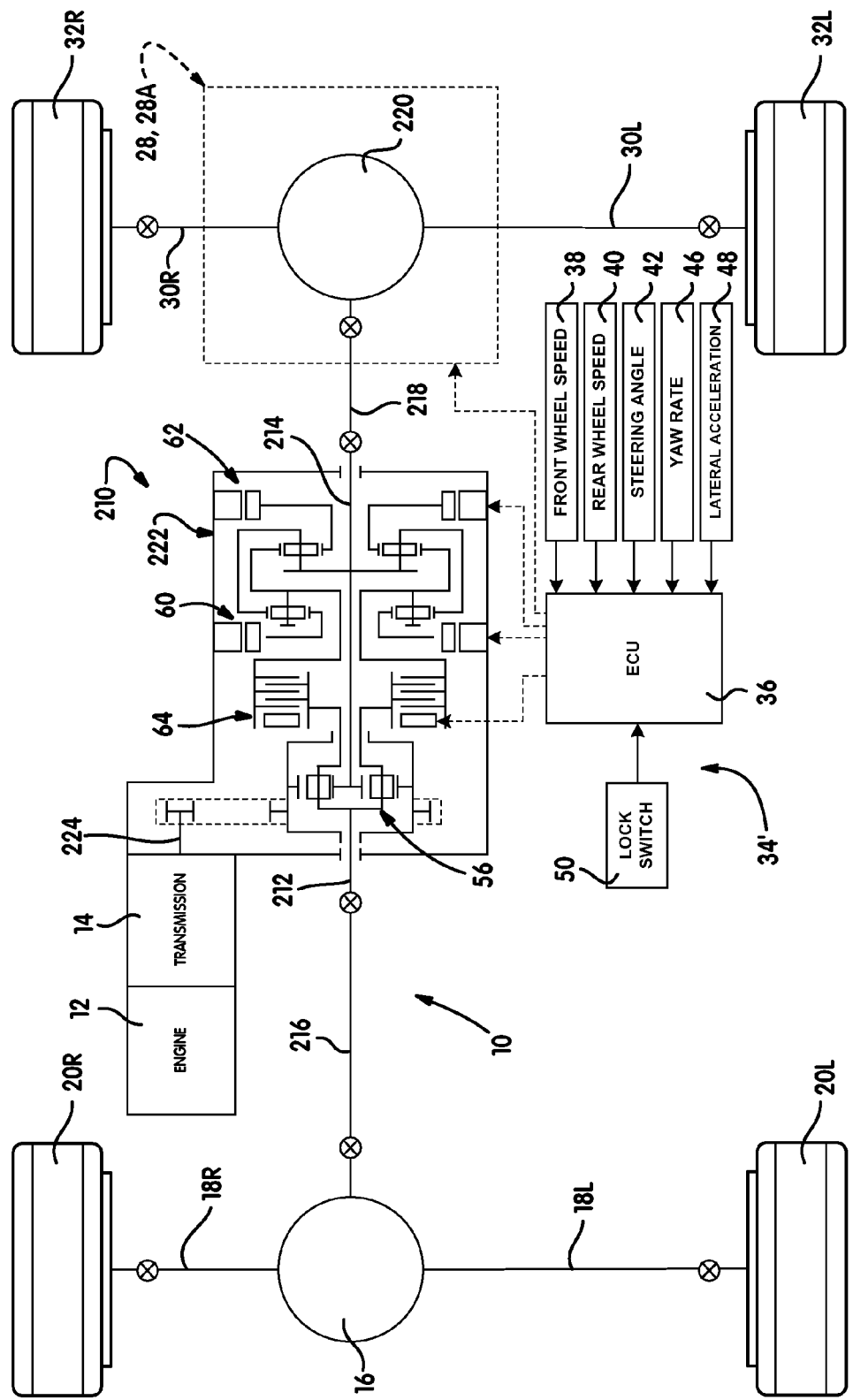
FIG. 5 is a diagrammatical illustration of a torque distributing differential assembly of the present invention installed in a power transfer unit for use in a four-wheel vehicle.

Referring now to FIG. 5, a four-wheel drive vehicle 10' is shown with a power transfer unit 210 operable for transferring drive torque from the output of transmission 14 to a first (i.e., front) output shaft 212 and a second (i.e., rear) output shaft 214. Front output shaft 212 drives a front propshaft 216 which, in turn, drives front differential 16 for driving front wheels 20L and 20R. Likewise, rear output shaft 214 drives a rear propshaft 218 which, in turn, drives a rear differential 220 for driving rear wheels 32L and 32R. Power transfer unit 210, otherwise known as a transfer case, includes a torque distribution mechanism 222 which functions to transmit drive torque from its input shaft 224 to both of output shafts 212 and 214 so as to bias the torque distribution ratio therebetween, thereby controlling the tractive operation of vehicle 10'. As seen, torque distribution mechanism 222 is operably associated with a traction control system 34' for providing this adaptive traction control feature.

Figure 6:
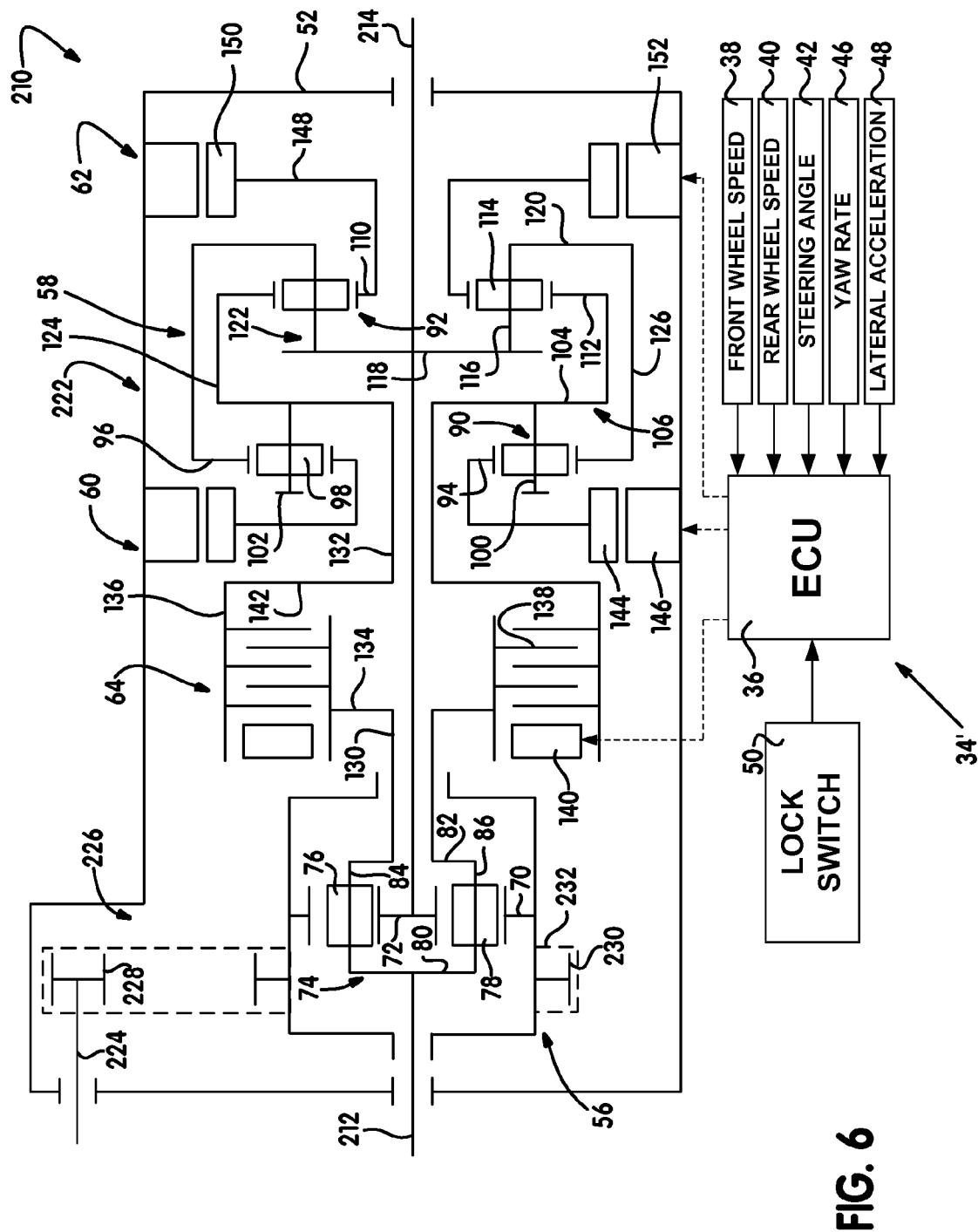
FIG. 6 is a schematic drawing of the power transfer unit shown in FIG. 5.

Referring primarily to FIG. 6, torque distribution mechanism 222 of power transfer unit 210 is shown to be generally similar in structure to drive mechanism 28 of FIG. 2 with the exception that ring gear 70 is now drivingly connected to input shaft 224 via a transfer assembly 226. In the arrangement shown, transfer assembly 226 includes a first sprocket 228 driven by input shaft 224, a second sprocket 230 driving ring gear 70 and a power chain 232 meshed therebetween. As seen, front output shaft 212 is driven by differential carrier 74 of differential unit 56 which now acts as a center or "interaxle" differential for permitting speed differentiation between front output shaft 212 and rear output shaft 214. In addition, sun gear 72 of differential unit 56 drives rear output shaft 214 while planet carrier 122 of second gearset 92 is also coupled to rear output shaft 214.

Control over actuation of brakes 60 and 62 and friction clutch 64 results in corresponding increases or decreases in the rotary speed of rear output shaft 214 relative to front output shaft 212, thereby controlling the amount of drive torque transmitted therebetween. In particular, with both of the brakes and the friction clutch released, unrestricted speed differentiation is permitted between the output shafts while the gear ratio established by the components of interaxle differential assembly 56 controls the front/rear torque ratio based on the current tractive conditions of the front and rear wheels. In contrast, with both brakes and the friction clutch all engaged, a locked four-wheel drive mode is established wherein no interaxle speed differentiation is permitted between the front and rear output shafts. Such a drive mode can be intentionally selected via lock switch 50 when vehicle 10' is driven off-road or during severe road conditions. An adaptive four-wheel drive mode is made available under control of traction control system 34' to vary the front-rear drive torque distribution ratio based on the tractive needs of the front and rear wheels as detected by the various sensors by selectively engaging one of brakes 60 and 62 and then adaptively controlling engagement of friction clutch 64. In addition to power transfer unit 210, vehicle 10' could also be equipped with a rear axle assembly having either drive mechanism 28 or 28A and its corresponding yaw control system, as is identified by the phantom lines in FIG. 5.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor vehicle, comprising:
a powertrain operable for generating drive torque;
a primary driveline for transmitting drive torque from said powertrain to first and second primary wheels;
a secondary driveline for selectively transmitting drive torque from said powertrain to first and second secondary wheels, said secondary driveline including an input shaft driven by said powertrain, a first axleshaft driving said first secondary wheel, a second axleshaft driving said second secondary wheel and a drive mechanism coupling said input shaft to said first and second axleshafts, said drive mechanism including a differential assembly, a planetary gear assembly, first and second brakes and a friction clutch, said differential assembly having an input component driven by said input shaft, a first output component driving said first axleshaft and a second output component driving said second axleshaft, said planetary gear assembly having a first gear, a second gear, a first carrier, a third gear rotatably supported by said first carrier and meshed with said first gear and said second gear, a fourth gear, a fifth gear driven by said first carrier, a second carrier coupled to said first axleshaft, and a sixth gear rotatably supported by said second carrier and meshed with said fourth gear and said fifth gear, said first brake is operable for selectively braking rotation of said first gear, said second brake is operable for selectively braking rotation of said fourth gear, and said friction clutch is operable for selectively coupling said first carrier to one of said input component and said second output component of said differential assembly; and a control system for controlling actuation of said first and second brakes and said friction clutch.

2. The motor vehicle of claim 1 wherein said drive mechanism is operable to establish an overdrive mode when said friction clutch is engaged with said first brake engaged and said second brake released such that said first axleshaft is overdriven relative to said second axleshaft.

3. The motor vehicle of claim 2 wherein said drive mechanism is operable to establish an underdrive mode when said friction clutch is engaged with said second brake engaged and said first brake released such that said first axleshaft is underdriven relative to said second axleshaft.

4. The motor vehicle of claim 1 wherein said drive mechanism is operable to establish a locked four-wheel drive mode when said friction clutch is engaged with both of said first and second brakes engaged.

5. The motor vehicle of claim 1 wherein said input shaft includes a pinion gear driving a hypoid ring gear, wherein said differential assembly includes a differential carrier driven by said hypoid ring gear, a first side gear fixed for rotation with said first axleshaft, a second side gear fixed for rotation with said second axleshaft, and pinion gears rotatably supported by said differential carrier and in meshed engagement with both of said first and second side gears, and wherein said friction clutch is operable for selectively coupling said differential carrier to said first carrier of said planetary gear assembly.

6. The motor vehicle of claim 1 wherein said input shaft includes a pinion gear driving a hypoid gear, wherein said differential assembly includes a ring gear driven by said hypoid gear, a sun gear fixed for rotation with said first axleshaft, a differential carrier fixed for rotation with said second axleshaft, a set of first pinions supported by said differential carrier and meshed with said ring gear and a set of second pinions supported by said differential carrier and meshed with said sun gear, wherein said first and second pinions are arranged in meshed pairs, and wherein said friction clutch is operable for selectively coupling said differential carrier to said first carrier of said planetary gear assembly.

7. The motor vehicle of claim 1 wherein said first gear is a first sun gear, said second gear is a first ring gear, said third gear is a first planet gear rotatably supported by said first carrier and meshed with said first sun gear and said first ring gear, said fourth gear is a second sun gear, said fifth gear is a second ring gear, and said sixth gear is a second planet gear rotatably supported by said second carrier and meshed with said second sun gear and said second ring gear.

8. A drive axle assembly for use in a motor vehicle having a powertrain and first and second wheels, comprising:

an input shaft driven by the powertrain;
a first axleshaft driving the first wheel;
a second axleshaft driving the second wheel;
a differential assembly having an input component driven by said input shaft, a first output component fixed for rotation with said first axleshaft and a second output component fixed for rotation with said second axleshaft;

a gear assembly having a first gear, a second gear, a first carrier rotatably supporting a third gear that is meshed with said first gear and said second gear, a fourth gear, a fifth gear fixed for rotation with said first carrier, and a second carrier fixed for rotation with said first axleshaft and rotatably supporting a sixth gear that is meshed with said fourth gear and said fifth gear;

a first brake for selectively inhibiting rotation of said first gear;

a second brake for selectively inhibiting rotation of said fourth gear;

a clutch for selectively coupling said first carrier with one of said input component and said second output component of said differential assembly; and a control system for controlling actuation of said first and second brakes and said clutch.

9. The drive axle assembly of claim 8 wherein said first brake is operable in a first mode to permit unrestricted rotation of said first gear and in a second mode to prevent rotation of said first gear, wherein said second brake is operable in a first mode to permit unrestricted rotation of said fourth gear and in a second mode to prevent rotation of said fourth gear, wherein said clutch is operable in a first mode to permit relative rotation between said first carrier and said one of said input component and said second output component of said differential assembly and in a second mode to prevent such relative rotation, and wherein said control system is operable for shifting each of said first and second brakes and said clutch between their corresponding first and second modes.

10. The drive axle assembly of claim 9 wherein an overdrive mode is established when said clutch is in its second mode with said first brake in its second mode and said second brake in its first mode such that said first axleshaft is driven at an increased rotary speed relative to said input component which causes said differential assembly to drive said second axleshaft at a corresponding decreased rotary speed relative to said input component.

11. The drive axle assembly of claim 9 wherein an underdrive mode is established when said clutch is in its second mode with said first brake in its first mode and said second brake in its second mode such that said first axleshaft is driven at a reduced rotary speed relative to said input component which causes said differential assembly to drive said second axleshaft at a corresponding increased rotary speed.

12. The drive axle of claim 8 wherein said first gear is a first sun gear, said second gear is a first ring gear, said third gear is a first planet gear rotatably supported by said first carrier and meshed with said first sun gear and said first ring gear, said fourth gear is a second sun gear, said fifth gear is a second ring gear, and said sixth gear is a second planet gear rotatably supported by said second carrier and meshed with said second sun gear and said second ring gear.

13. A drive axle assembly for use in a motor vehicle having a powertrain and first and second wheels, comprising:

an input shaft driven by the powertrain;
a first axleshaft driving the first wheel;
a second axleshaft driving the second wheel;
a differential assembly having an input component driven by said input shaft, a first output component coupled for rotation with said first axleshaft and a second output component coupled for rotation with said second axleshaft, a first gearset having a first sun gear, a first ring gear and first planet gears rotatably supported by a first carrier that are meshed with said first sun gear and said first ring gear;
a second gearset having a second sun gear, a second ring gear fixed for rotation with said first carrier, a second carrier fixed for rotation with said first axleshaft and second planet gears rotatably supported by said second carrier that are meshed with said second sun gear and said second ring gear;
a first brake for selectively inhibiting rotation of said first sun gear;
a second brake for selectively inhibiting rotation of said second sun gear;
a clutch for selectively coupling said first carrier for rotation with one of said input component and said second output component of said differential assembly; and
a control system for controlling actuation of said clutch and said first and second brakes.

14. The drive axle assembly of claim 13 wherein said first brake is operable in a first mode to permit unrestricted rotation of said first sun gear and in a second mode to prevent rotation of said first sun gear, wherein said second brake is operable in a first mode to permit unrestricted rotation of said second sun gear and in a second mode to prevent rotation of said second sun gear, wherein said clutch is operable in a first mode to permit relative rotation between said first carrier and said one of said input component and said second output component of said differential assembly and in a second mode to prevent such relative rotation, and wherein said control system is operable for shifting of each said clutch and said first and second brakes between their corresponding first and second modes.

15. The drive axle assembly of claim 14 wherein an overdrive mode is established when said clutch is in its second mode with said first brake in its second mode and said second brake in its first mode.

16. The drive axle assembly of claim 14 wherein an underdrive mode is established when said clutch is in its second mode with said first brake in its first mode.

17. A transfer case for a four-wheel drive vehicle having a powertrain and first and second drivelines, comprising:
an input shaft driven by the powertrain;
a first output shaft driving the first driveline;
a second output shaft driving the second driveline;
a torque transfer mechanism operably interconnecting said input shaft to said first and second output shafts, said torque transfer mechanism including a differential assembly, a planetary gear assembly, a transfer clutch and first and second brakes, said differential assembly having an input component driven by said input shaft, a first output component driving said first output shaft and a second output component driving said second output shaft, said planetary gear assembly having a first gear, a second gear, a first carrier rotatably supporting a third gear that is meshed with said first gear and said second gear, a fourth gear, a fifth gear driven by said first carrier, and a second carrier driven by said first axleshaft and rotatably supporting a sixth gear that is meshed with said fourth sun gear and said fifth gear, said first brake is operable for selectively inhibiting rotation of said first gear, said second brake is operable for selectively inhibiting rotation of said fourth gear, and said transfer clutch is operable for selectively coupling said first carrier to one of said input component and said second output component of said differential assembly; and
a control system for controlling actuation of said first and second brakes and said transfer clutch.

18. The transfer case of claim 17 wherein said first gear is a first sun gear, said second gear is a first ring gear, said third gear is a first planet gear rotatably supported by said first carrier and meshed with said first sun gear and said first ring gear, said fourth gear is a second sun gear, said fifth gear is a second ring gear, and said sixth gear is a second planet gear rotatably supported by said second carrier and meshed with said second sun gear and said second ring gear.

19. A power transfer assembly for use in a motor vehicle having a powertrain and first and second drivelines, comprising:
an input shaft driven by the powertrain;
a first shaft driving the first driveline;
a second shaft driving the second driveline;
a differential assembly having an input member driven by said input shaft, a first output member fixed for rotation with said first shaft and a second output member fixed for rotation with said second shaft;
a gear assembly having a first gear, a second gear, a first carrier rotatably supporting a third gear that is meshed with said first gear and said second gear, a fourth gear, a fifth gear fixed for rotation with said first carrier, a second carrier fixed for rotation with said first shaft, and a sixth gear rotatably supported by said second carrier and meshed with said fourth gear and said fifth gear;
a first brake for selectively inhibiting rotation of said first gear;
a second brake for selectively inhibiting rotation of said fourth gear;
a transfer clutch for selectively coupling said first carrier to one of said input member and said second output member of said differential assembly; and
a control system for controlling actuation of said transfer clutch and said first and second brakes.

20. The power transfer assembly of claim 19 wherein said first gear is a first sun gear, said second gear is a first ring gear, said third gear is a first planet gear rotatably supported by said first carrier and meshed with said first sun gear and said first ring gear, said fourth gear is a second sun gear, said fifth gear is a second ring gear, and said sixth gear is a second planet gear rotatably supported by said second carrier and meshed with said second sun gear and said second ring gear.

* * * * *